United States Patent Office 3,310,377
Patented Mar. 21, 1967

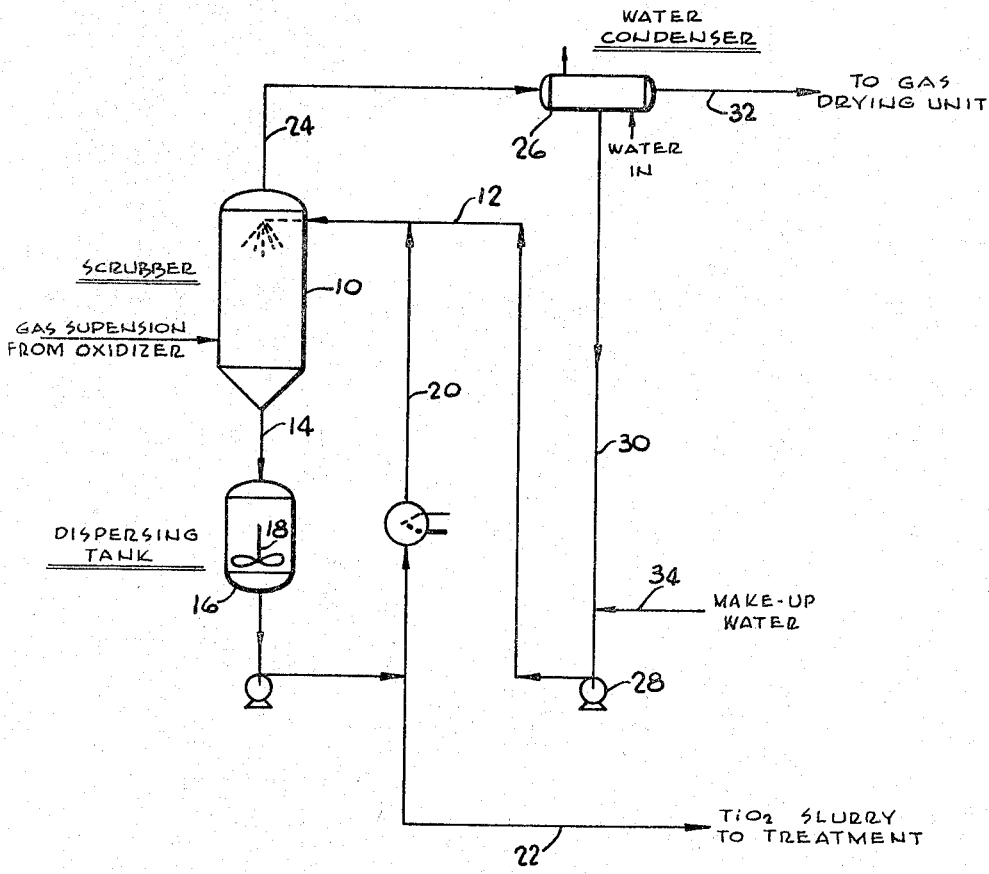

3,310,377
PROCESS FOR TREATING A GASEOUS MIXTURE CONTAINING TITANIUM DIOXIDE
David R. Stern, Fullerton, and Richard M. Gundzik, San Bernardino, Calif., assignors to American Potash & Chemical Corporation, Los Angeles, Calif., a corporation of Delaware
Filed Aug. 13, 1964, Ser. No. 389,423
3 Claims. (Cl. 23—202)

The present invention relates to a process for cooling and separating a mixture of components contained within a hot gas stream. More particularly, this invention relates to treating a hot, mixed stream of finely divided solids, for example, titanium dioxide and various gases to quench the same and effect a separation of at least the solids from the gases.

In one process for producing titanium dioxide, vaporized titanium tetrachloride is oxidized to produce a hot, solids-gaseous reaction stream containing a mixture of particulate, pigmentary titanium dioxide and a gaseous mixture including unreacted titanium tetrachloride and chlorine, oxygen and hydrogen chloride as well as any inert purge gas such as nitrogen. The economics of that process are such that when practiced on a commercial scale it is desirable to recover at least the chlorine, oxygen and nitrogen for re-use in an earlier stage of the process. In the past, considerable difficulty has been experienced in satisfactorily quenching such a hot, mixed reaction stream in a manner such that recovery of desired solid and gaseous products could be effected economically and conveniently.

The surprising discovery now has been made of a process which is both economical and convenient whereby such a hot, mixed solids-gaseous reaction stream can be quenched and separated into its solid and gaseous components. Broadly, this invention comprises contacting such a hot, mixed stream containing at least solid pigmentary titanium dioxide and gaseous chlorine, oxygen, titanium tetrachloride and hydrogen chloride with liquid water. This results in a provision of an aqueous titanium dioxide slurry and a stream of a relatively cool gaseous mixture containing at least chlorine, oxygen and water.

The aqueous slurry of titanium dioxide is conducted to such further treatment facilities as may be required to provide a finished titanium dioxide product of specified properties. The relatively cool gaseous mixture is treated to remove water and leave a dry, gaseous stream of chlorine and oxygen which may be recycled to an earlier step in the titanium dioxide producing process, for example, to apparatus in which titanium-containing raw materials are chlorinated. This stream also will include any nitrogen used as a purge gas.

For a more complete understanding of the present invention reference is made to the accompanying drawing, the single figure of which comprises a schematic illustration of apparatus suitable for use in carrying out the invention.

As illustrated on the drawing, a hot, mixed stream exiting from an oxidizer (not shown) is introduced into the lower portion of a scrubber 10. The hot stream issuing from the oxidizer is generally at a temperature between about 300° and 1000° C. The composition of this mixed stream of hot gases and solids may contain:

| Constituent: | Mol percent |
|---|---|
| $Cl_2$ | 64.7–40.4 |
| $N_2$ | 0–25.2 |
| $O_2$ | 0.7–7.6 |
| $TiCl_4$ | 0.5–5.1 |
| HCl | 2.0–1.5 |
| $TiO_2$ | 32.1–20.2 |

Relatively cold water, for example, about 20° to 75° C., is introduced into scrubber 10 through line 12 and sprayed or otherwise dispersed into the gaseous suspension. The pigmentary titanium dioxide introduced into scrubber 10 forms an aqueous slurry with the water, which slurry settles to the bottom of the scrubber. The slurry then is conveyed through line 14 into a dispersing tank 16 provided with an agitator 18.

The solids concentration in the slurry can be adjusted to any desired content by pumping the slurry from tank 16 through line 20 and recycling it back to scrubber 10 until it has reached the desired concentration. In general, the $TiO_2$ content of the slurry can vary in amounts up to about 60 weight percent. The slurry, when adjusted to the desired solids content, then is conveyed through a line 22 to a treating facility (not shown) where it may be subjected to further treatment, if necessary, to provide pigmentary properties rendering it suitable for use in the manufacture of paints, paper, floor coverings, and the like end products.

Certain of the gaseous components introduced into scrubber 10 will dissolve in the water introduced therein. Thus, the titanium tetrachloride will dissolve in the water and hydrolyze to produce what may be termed "acid-soluble titanium compounds" such as titanium hydroxide; titanium hydroxy chlorides, for example, $Ti(OH)Cl_3$, $Ti(OH)_2Cl_2$, and $Ti(OH)_3Cl$; and like compounds, depending upon the quantity of titanium tetrachloride present in the original gas stream. The acid-soluble titanium compounds precipitate and settle into the aqueous slurry of pigmentary titanium dioxide to become intimately associated with the pigment.

The concept of converting unreacted gaseous titanium tetrachloride to said acid-soluble titanium compounds and associating the same with the pigmentary titanium dioxide constitutes a particularly important feature of this invention. Thus, in certain prior art processes, titanium tetrachloride or other compounds which form acid-soluble titanium compounds must be added deliberately to the titanium dioxide pigment in subsequent treatment or finishing operations to impart the desired end-use pigmentary characteristics to the product. By forming the acid-soluble titanium compounds directly in scrubber 10, the process of the present invention provides a considerable savings in both capital investment and in operating costs by eliminating this otherwise required step in the treatment or finishing operation.

It will be appreciated that the operating conditions in the oxidizer are controlled in such manner whereby to assure a content of unreacted titanium tetrachloride in the gas mixture entering scrubber 10 such that upon the treatment thereof with water, the desired quantities of acid-soluble titanium compounds become associated with the pigmentary product.

Furthermore, since the unreacted titanium tetrachloride gas is converted to desired acid-soluble titanium compounds which are utilized in the manner just described, the process of this invention eliminates the need, inherent in certain prior processes, of separating and recovering the vaporous titanium tetrachloride and then purifying the same prior to recycling it to the oxidizer.

The solubility of the gases, other than titanium tetrachloride, in the aqueous environment in scrubber 10 varies depending upon the temperature of the water introduced therein through line 12. In general, less quantities of the gases will dissolve in hot water than in cold water. Therefore, to make certain that as little chlorine gas as possible dissolves in the water, to thereby become lost from the gas stream, the water introduced into scrubber 10 should be at a temperature within the range of 20–75° C. whereby the temperature of the slurry is at or just below its boiling point.

In practice, it has been found preferable to introduce a relatively large quantity of water into the scrubber, that is, more water than would be needed to provide any given predetermined solids concentration in the slurry. By operating in this manner, the excess water is vaporized and facilitates the removal of the other gases from the scrubber.

Those gases leave the scrubber 10 through line 24 at a temperature between about 10° and 110° C. That gas stream comprises at least chlorine, oxygen and water in the proportions indicated below.

| Constituents: | Mol percent |
| --- | --- |
| $Cl_2$ | 98–14 |
| $N_2$ | 0–9 |
| $O_2$ | 1–2 |
| $H_2O$ | 1–75 |

In the titanium dioxide manufacturing process referred to above, it is desirable that the chlorine and oxygen in this cool gas stream be recovered as a dry mixture. To dry such a cool gas stream, it is passed to a water condenser 26. A relatively large portion of the water in the gas stream is condensed here and recycled, by means of pump 28, through lines 30 and 12 back to scrubber 10. Make-up water, if needed, may be introduced at any convenient location, for example, through line 34.

The substantially dry gases leave condenser 26 and are passed through a line 32 to conventional gas-drying equipment (not shown) wherein residual quantities of moisture are removed. The dried gases then are suitable for recycle to chlorinating apparatus for re-use in the titanium dioxide manufacturing process or for other suitable uses.

This process is preferably operated continuously but may be operated on a batch or semi-continuous basis, if desired.

In the specification, appended claims and following example, all parts and percentages are by weight unless otherwise specified. The example is submitted only for purposes of further illustrating the invention, not to limit the scope thereof in any way.

*Example*

A gaseous suspension, having a temperature of 1000° C., obtained upon the vapor phase oxidation of titanium tetrachloride and having the following composition:

| Constituents: | Mol percent |
| --- | --- |
| $Cl_2$ | 61.5 |
| $N_2$ | 0.8 |
| $O_2$ | 4.9 |
| $TiCl_4$ | 1.6 |
| $HCl$ | 0.4 |
| $TiO_2$ | 30.8 | is passed continuously into scrubber 10 and continuously contacted with liquid water introduced into the scrubber through line 12. The water is introduced at a temperature of 30° C. and in a quantity sufficient to provide an aqueous slurry of titanium dioxide which contains about 50 weight percent titanium dioxide. The slurry is withdrawn to the dispersing tank 16 and is passed forward continuously for subsequent treatment while the remainder is continuously recycled to the scrubber to maintain the slurry concentration at a constant value. The cool gases emitting from the scrubber 10 are at about 98° C. and have the following composition:

| Constituents: | Mol percent |
| --- | --- |
| $Cl_2$ | 37.1 |
| $N_2$ | 0.5 |
| $O_2$ | 2.9 |
| $H_2O$ | 59.5 |

These cool gases are conducted to the water condenser 26 wherein about 98% of the water is removed. The condensed water along with any make-up water which may be required from time to time is cooled and pumped to the scrubber 10. The partially dried gases are conducted to a sulfuric acid gas-drying column wherein residual quantities of water are removed. The dried gas stream then is suitable for recycle to chlorinating apparatus.

The process of this invention conveniently is operated under atmospheric pressure. It will be understood, however, that it may be operated under vacuum or under pressure, as desired. The operation of scrubber 10 under a pressure greater than atmospheric pressure will increase the solubility of the gases in the aqueous titanium dioxide slurry. Conversely, the use of a vacuum will decrease the solubility of the gases in the slurry. Therefore, if the process is to be operated under vacuum or under pressure, suitable compensating operational changes must be made to assure minimum chlorine loss by solution in the slurry.

The pigmentary titanium dioxide normally will be well dispersed in the aqueous slurry, if the slurry has a pH of less than about 4. Such an acid pH is imparted to the slurry by the HCl released therein upon hydrolysis of the titanium tetrachloride and to some degree by the additive effect obtained by the dissolution of hydrogen chloride and chlorine gas into the slurry.

A pigmentary slurry having a pH of less than about 4 can be conveyed directly to a suitable finishing or treatment station and other chemicals added thereto, as desired. Alternatively, the slurry may be neutralized (neutralization salts being removed, if desired) with the addition of a suitable dispersant before being conveyed forward to the finishing or treatment station.

It is within the ambit of this invention that such small quantities of vaporous titanium tetrachloride, hydrogen chloride and chlorine will be introduced into the system that the resultant slurry may have a pH higher than about 4. In such cases, to obtain satisfactory pigmentary dispersion, it is only necessary to introduce appropriate quantities of certain compounds capable of increasing the hydrogen ion concentration of the slurry. Alternatively, one or more suitable dispersants may be employed to achieve equivalent results.

It will be understood by those skilled in the art that the utilization of the present process provides substantial advantages over techniques utilized in the prior art for quenching gaseous suspensions such as $TiO_2$-gas mixtures exiting from a titanium dioxide vapor phase reactor. By introducing the hot gaseous suspension directly into contact with relatively cold water, it no longer is necessary to cool such a suspension to low temperatures through costly and difficult to maintain heat exchange equipment. Furthermore, the process of this invention eliminates the need for bag filters to collect solids from the gaseous suspension.

Moreover, direct quenching of the oxidizer exit suspension in water eliminates the need for handling hot, dry pigment, which hot dried pigment tends to agglomerate and which, to be handled properly, requires expensive, corrosion-resistant water cooled equipment. Direct quenching also allows for the elimination or at least substantial reduction of subsequent grinding equipment which permits a substantial savings in both operating and capital costs.

The process of this invention also is applicable to the treatment of gas-solid suspensions containing scouring agents such as sand, alumina, titanium dioxide aggregates and the like. When such suspensions are introduced into scrubber 10, the scouring agent will settle into the aqueous slurry and can be removed therefrom by convenient filtration or other separation techniques.

As will be understood by those skilled in the art, what has been described are preferred embodiments of the invention; however, many modifications, changes and substitutions can be made therein without departing from its true scope and spirit as defined in the following claims.

What is claimed is:

1. In a process for treating a hot mixture of solid titanium dioxide particles in gases including titanium tetrachloride vapor, oxygen, chlorine and hydrogen chloride to recover said titanium dioxide particles therefrom, said hot mixture having a temperature within the range of from about 300° C. to about 1,000° C., the improvements which comprise: continuously contacting said hot mixture with a cooled circulating water dispersion of previously recovered titanium dioxide particles to remove substantially all of said hot titanium dioxide particles from said hot mixture and form a reaction dispersion in which said removed $TiO_2$ particles are dispersed, continuously recovering a portion of said reaction dispersion in a form such that it is suitable for immediate surface treatment and continuously cooling and adding water to the remainder of said reaction dispersion and circulating it into contact with additional quantities of said hot gaseous mixture; said hot gaseous mixture being provided with sufficient hydrolyzable titanium tetrachloride vapor to continuously form acid-soluble titanium compounds and maintain the pH of the dispersion below about 4.

2. A process as set forth in claim 1 wherein the temperature of the water with which the hot mixture is contacted is within the range of 20° C. to 75° C. whereby the temperature of the aqueous slurry is no higher than its boiling point.

3. A process as set forth in claim 1 wherein the gaseous stream is treated to remove substantially all the water vapor and the stream then is recycled for production of further hot mixture.

References Cited by the Examiner

UNITED STATES PATENTS

| | | | |
|---|---|---|---|
| 1,842,620 | 1/1932 | McInerny et al. | 23—202 |
| 1,967,235 | 7/1934 | Ferkel | 23—202 |
| 2,559,638 | 7/1951 | Krchma et al. | 23—202 |
| 2,721,626 | 10/1955 | Rick | 23—202 |
| 2,899,278 | 8/1959 | Lewis | 23—202 |
| 2,937,928 | 5/1960 | Hughes et al. | 23—202 |
| 3,073,092 | 1/1963 | Ancrum et al. | 23—202 X |
| 3,224,215 | 12/1965 | Bramekamp et al. | 23—202 X |

FOREIGN PATENTS

| | | |
|---|---|---|
| 535,213 | 4/1941 | Great Britain. |
| 684,016 | 12/1952 | Great Britain. |

OSCAR R. VERTIZ, *Primary Examiner.*

EDWARD STERN, *Examiner.*